May 26, 1942.            K. C. RIPLEY            2,283,951
COMMUTATOR OSCILLOGRAPH DEVICE

Filed June 28, 1939

INVENTOR
KENNETH C. RIPLEY
BY *W. Glenn Jones*
ATTORNEY

Patented May 26, 1942

2,283,951

UNITED STATES PATENT OFFICE 2,283,951

COMMUTATOR OSCILLOGRAPH DEVICE

Kenneth C. Ripley, Washington, D. C.

Application June 28, 1939, Serial No. 281,660

6 Claims. (Cl. 171—95)

(Granted under the act of March 3, 1883, as amended April 30, 1928; 370 O. G. 757)

This invention relates to a means for showing on the ordinary cathode-ray oscillograph several direct-current voltages which may be observed simultaneously and individually.

It is an object of the invention to produce on the viewing screen of a cathode-ray oscillograph a separate indication of each of several voltages being observed and to cause each indication to move in exact accordance with changes in the voltage it represents.

A particular application of the invention is to a device invented by Robert H. Canfield for which an application Serial No. 250,383, entitled "Method of and apparatus for examining ferromagnetic articles" was filed Jan. 11, 1939. In that application we are interested in observing as many as ten direct-current voltages simultaneously. The several direct-current voltages are the rectified pick-up voltages of the lamination detector. Each voltage is the reading from the detector for a corresponding location across the width of a plate.

All of the foregoing direct-current voltages may be viewed simultaneously, and so compared each with the others, by the device herein to be described. Movement of a plate through the lamination detector will cause variations in the pick-up voltages, and these changes of voltage will be shown up faithfully and with practically instantaneous response on the viewing screen of the cathode-ray oscillograph. Due to the well known properties of almost instant response of the electron beam, and the high input impedance of the oscillograph, it makes an ideal voltmeter.

Figure 1:
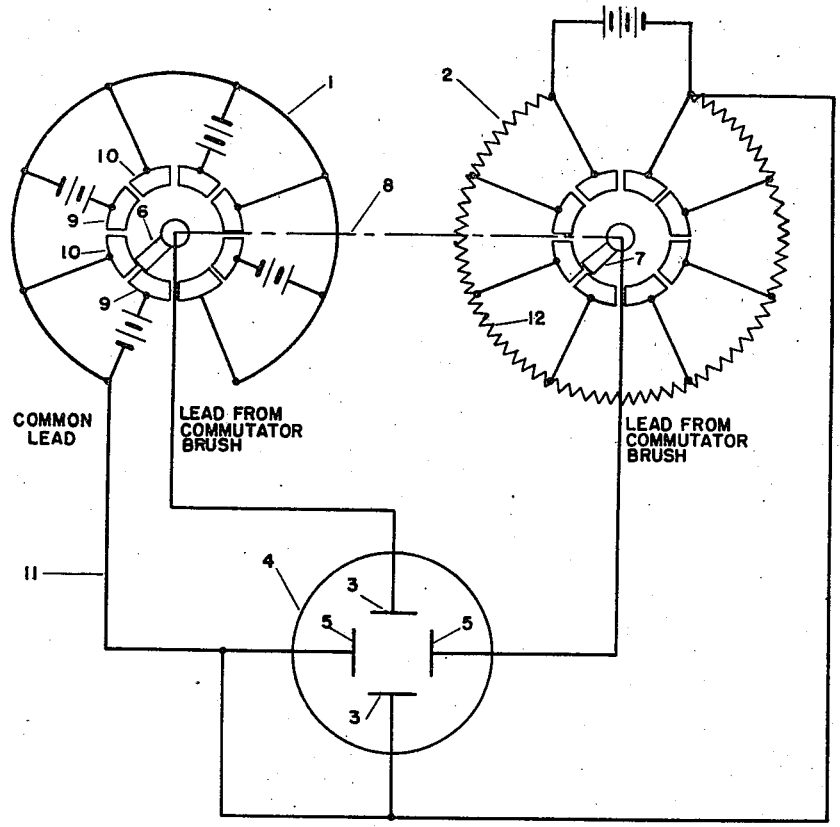
Fig. 1 is a diagrammatic view showing the electrical connection of the device.

Essentially, the device consists of two commutators, as shown in Fig. 1, one of which, marked 1, is for picking off in succession any predetermined number of direct-current voltages to be observed, these being applied to the vertical deflection plates 3 of the oscillograph 4, and a second commutator, marked 2, mechanically synchronized with the first commutator in order to provide a proper sweep-circuit voltage to spread the first commutated voltage horizontally across the width of the viewing screen of the cathode-ray oscillograph. This voltage is applied to the horizontal deflection plate 5 of the oscillograph.

The brush 6 of commutator 1 and the brush 7 of commutator 2 are mechanically connected by a shaft or other means, indicated by the construction line 8 in Fig. 1. By this connection their movements are synchronized.

In commutating direct-current voltages for projection on the viewing screen of the oscillograph, the best performance is obtained when the electrically live segments 9 of the commutator 1 are separated by neutral segments 10 (one for each space between the live segments around the circumferences of the commutator). The neutral segments are all connected together and connected to the common lead 11 of the input voltages. The leads for the high side of the input voltages are connected to respective live segments of the commutator.

The purpose of the neutral segments interspaced between the live segments is twofold; namely, (1) to prevent direct contact at any time between two live segments, which contact would result in some averaging of the two voltages, and, (2), to furnish a row of marks on the viewing screen as a datum or zero line, for distinguishing between plus and minus voltage indications.

The built-in sweep circuit of an ordinary cathode-ray oscillograph is not suitable for spreading a very irregular wave form across the viewing screen of the oscillograph, on account of difficulties of synchronization. For spreading across the screen the commutated voltage obtained from commutator 1, an externally synchronized sweep-circuit voltage is needed. Perfect external synchronization is obtained by the rigid connection 8 between the brushes of commutators 1 and 2 which causes them to sweep their respective commutators at the same angular speed. Commutator 2 may have any one of many choices for number of segments, but a very satisfactory choice is to have the number of segments in commutators 1 and 2 equal. The number of segments in commutator 2 may be any whole number of times the number in commutator 1.

The segments of commutator 2 should be connected, in order, to taps from a resistor, such as 12, so that commutation of the segments will product a series of steps of increasing voltage approximating to the smooth saw tooth wave form used in oscillographs for obtaining a linear time-rate of sweep.

Figure 2:
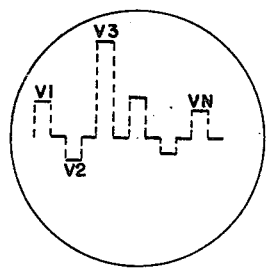
Fig. 2 is a plan view of the fluorescent screen of the oscillograph showing the several voltage indications as they would appear when using a commutator having an infinite number of segments; and, Fig. 3 is a similar view showing the type of indication which is produced by the use of a pair of commutators having a finite equal number of segments.

If commutator 2 were made with an infinite number of segments, which is possible only in theory, the wave form from commutator 1 would appear on the viewing screen of the oscillograph as shown in Fig. 2. The alternate dashes which are all on the same line lie along the line of zero input voltage, and correspond with neutral segments of the commutator. The other dashes lie at various distances above or below the reference line, depending upon the magnitude and sign of the respective input direct-current voltages, the reason that the dashes are continuous and horizontal being that the sweep circuit voltage is continuously changing while the vertical coordinate remains constant. A change in any one of the input voltages would cause the indication for that particular voltage to rise or fall in exact correspondence with the magnitude and sign of the change in input voltage.

Figure 3:
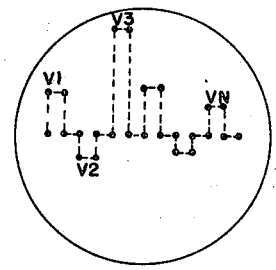

If for reasons of convenience in construction, the number of segments in commutators 1 and 2 are made equal, the indications shown in Fig. 2 will be replaced by those shown in Fig. 3. The only difference between the two types of indication is that each dash of Fig. 2 will have been replaced by a pair of dots in Fig. 3. The movable pairs of dots of Fig. 3 move up and down just as do the movable dashes of Fig. 2.

The simplest way of making electrical connections for commutators 1 and 2 is to have them held stationary, and thus make the brushes rotate. The voltages collected by the rotating brushes have only to be transferred to slip rings and then collected by other stationary brushes for taking off leads to oscillograph terminals.

While only a single embodiment of the invention has been illustrated and described, it is to be understood that the scope of the invention is to be limited only by the limitations of the subjoined claims.

The invention described herein may be manufactured and/or used by or for the Government of the United States of America for governmental purposes without the payment of any royalties thereon or therefor.

I claim:

1. Means for simultaneously indicating a plurality of direct-current voltages on the viewing screen of a cathode-ray oscillograph, comprising a first commutator having a plurality of live segments each of which is connected to a source of one of said voltages, and a plurality of neutral segments, one of which is located between each pair of said live segments, a second commutator having a plurality of segments, the number of which is a whole number of times the number of those in said first commutator, a resistor, the segments of said second commutator being connected in order at spaced points along said resistor, a pair of brushes, each arranged to sweep the segments of one of said commutators, means connecting said brushes in such a manner that they must move in unison, means connecting the brush of said first commutator and the sources of voltages to be indicated across the vertical deflection plates of said oscillograph, and means connecting the brush of said second commutator and a terminal of said resistor across the horizontal deflection plates of said oscillograph.

2. Means for simultaneously indicating a plurality of direct-current voltages on the viewing screen of a cathode-ray oscillograph, comprising a first commutator having a plurality of live segments, each of which is connected to a source of one of said voltages, and a plurality of neutral segments, one of which is located between each pair of said live segments, a second commutator having a plurality of segments, the number of which is a whole number of times the number of segments in said first commutator, said segments being connected in order to a progressively changing series of voltage sources, a brush means associated with each of said commutators, means connecting said brush means in such a manner that they must move in unison, means connecting the sources of said voltages to be indicated and the brush means of said first commutator across the vertical deflection plates of said oscillograph, and means connecting the brush means of said second commutator and said series of voltage sources across the horizontal deflection plates of said oscillograph.

3. Means for simultaneously indicating a plurality of direct-current voltage on the viewing screen of a cathode-ray oscillograph, comprising a commutator, a plurality of live segments forming a part of said commutator, each of said segments being connected to a source of one of said voltages, a plurality of neutral segments, one of said neutral segments being located between each pair of live segments, a brush arranged to sweep said segments, means connecting said brush and said sources of voltage across the vertical deflection plates of said oscillograph, and means synchronized with said brush and arranged to impress across the horizontal deflection plates of said oscillograph one of a stepped series of voltages during the time said brush is in contact with each of said segments.

4. Means for indicating a series of direct-current voltages on the viewing screen of a cathode ray oscillograph, such indication being in the form of a graph showing said voltages as a series of deviations from a no-voltage base line, comprising means for successively impressing, for equal periods of time, on the vertical deflection plates of said oscillograph, a series of voltages comprising said voltages to be indicated and alternating these with a series of zero voltage intervals, and means for impressing on the horizontal deflection plates of said oscillograph a series of stepped voltages at intervals equal to and synchronized with those utilized for impressing voltages on said vertical deflection plates.

5. A device for measuring a plurality of unknown voltages, comprising a cathode ray tube with a screen light sensitive to electron bombardment and an electron gun for projecting an electron beam on said screen, means for deflecting said beam vertically, means for deflecting said beam horizontally, a switch for selectively applying said unknown voltages to the vertical deflecting means, a direct current voltage source, a second switch mechanically interlocked with the first switch for applying a different and predetermined steady direct current voltage from said source to the horizontal deflecting means for each unknown voltage applied to the vertical deflecting means.

6. In combination in a device for measuring a plurality of unknown voltages, a cathode ray tube with a screen of material which fluoresces when bombarded with electrons and means for projecting a beam of electrons on said screen, horizontal deflecting means for said beam, a direct current voltage source connected to the horizontal deflecting means for impressing on the beam a predetermined steady deflecting field, switch means in circuit with said source for selectively changing step-by-step the value of the direct current voltage of said source impressed on said deflecting means and for instantaneously changing the intensity of the horizontal deflecting field from the predetermined steady value of one step to the predetermined steady value of another step, vertical deflecting means for said beam, a second switch means for selectively impressing a plurality of voltages proportional in amplitude to the voltages to be measured on said vertical deflecting means to deflect the beam in a vertical direction, and switch interlocking means for impressing a different predetermined steady horizontal deflecting field on said beam for each unknown voltage impressed upon the vertical deflecting means.

KENNETH C. RIPLEY.